UNITED STATES PATENT OFFICE.

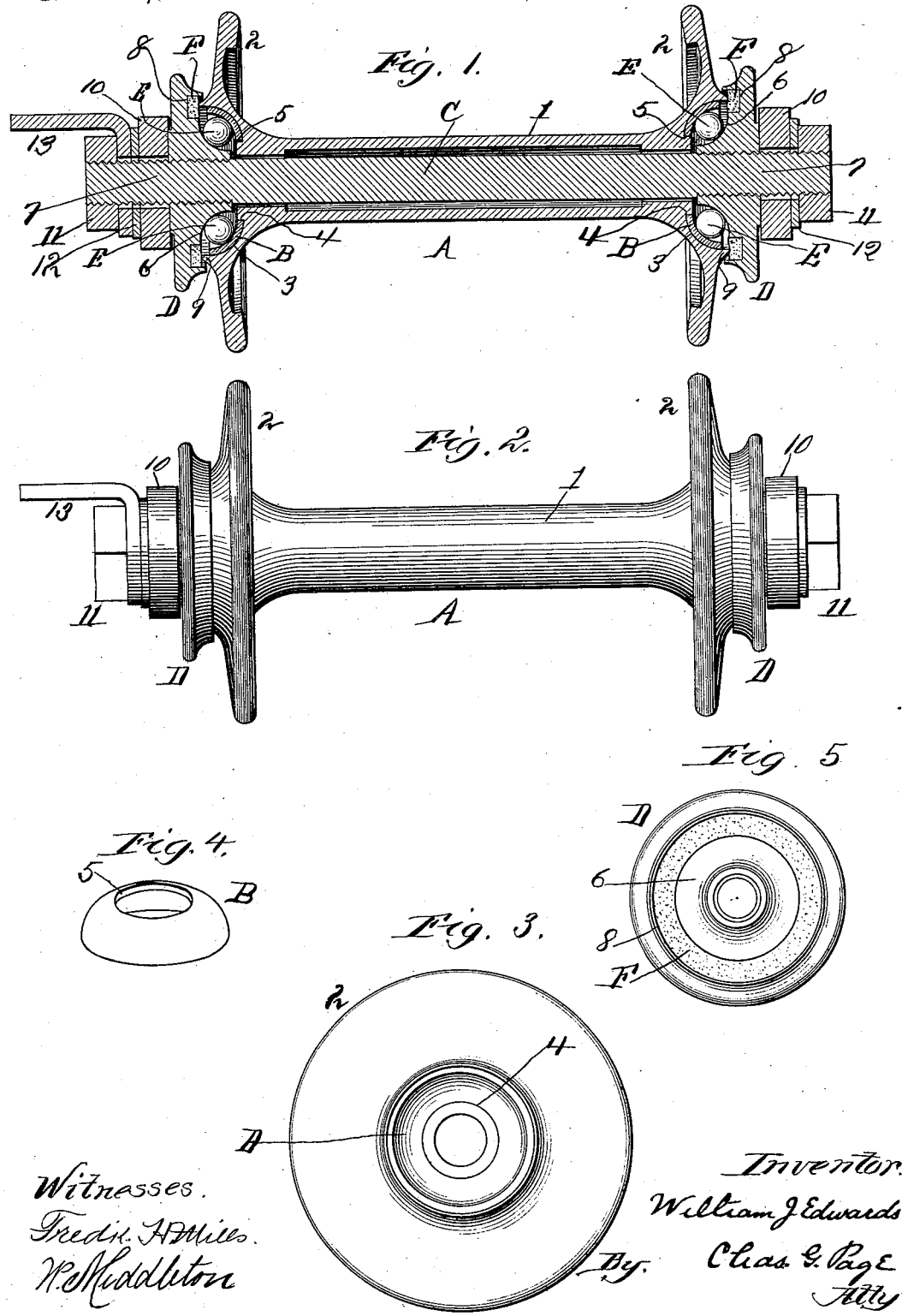

WILLIAM J. EDWARDS, OF CHICAGO, ILLINOIS, ASSIGNOR TO THE UNION MANUFACTURING AND PLATING COMPANY, OF SAME PLACE.

VELOCIPEDE.

SPECIFICATION forming part of Letters Patent No. 469,883, dated March 1, 1892.

Original application filed April 14, 1890, Serial No. 347,893. Divided and this application filed September 1, 1891. Serial No. 404,405. (No model.)

*To all whom it may concern:*

Be it known that I, WILLIAM J. EDWARDS, a citizen of the United States, residing at Chicago, in the county of Cook and State of Illinois, have invented a new and useful Improvement in Velocipedes, of which the following is a specification.

This application is made as a division of my application for Letters Patent of the United States filed April 14, 1890, and serially numbered 347,893, and relates to the construction of ball-bearings and dust-guards for the front and rear axles.

In the accompanying drawings the objects of my invention are to economize in the manufacture of bicycles; to provide a simple, compact, durable, and efficient construction; to effectively exclude dust and moisture from the ball-bearings; to permit the user to readily and accurately repair any injury to the ball-bearings without sending the machine to a factory or repair-shop, and to provide certain novel and improved details.

To the attainment of the foregoing and other useful ends my invention consists in matters hereinafter set forth, and particularly pointed out in the claims.

In the accompanying drawings, Figure 1 represents a section taken centrally and longitudinally through one of the axles and adjuncts. Fig. 2 represents the same in elevation. Fig. 3 is an end view of one of the hub-flanges. Fig. 4 shows in perspective one of the annular cup-shaped bearings. Fig. 5 is an end view of one of the adjustable end caps, which also forms a section of one of the two-part bearings.

The wheel-hub A comprises a sleeve or middle tubular portion 1, which is provided at each end with an annular flange 2. The wire spokes of the wheel are secured to these end flanges of the hub in any suitable way, and said tube or sleeve, which forms the middle portion and main length of the hub, is preferably made integral with its end flanges, so as to provide an economical, simple, and durable construction. Each of these flanged ends of the hub is adapted to provide an annular seat 3 for an annular cup-shaped bearing B of hardened steel. The annular seats 3 are countersunk in the enlarged flanged ends of the sleeve 1, so as to provide each with an annular offset or shoulder 4, which forms an abutment for the inner annular edge 5 of the annular cup-shaped or cup-ring bearing B, in which way said bearing will be securely and accurately held in place under all circumstances and usage and will not be subject to any bending or deflection or crowding toward the axle C, which extends through the tubular flanged hub and projects beyond the end flanges thereof. Each cup-ring bearing B forms one side or section of a two-part adjustable bearing for a set of balls, the opposing sides or sections of said bearings being formed by annular concaved bearing-surfaces 6, with which the nuts or end caps D are provided. The two opposing bearing-surfaces thus provided for each set of balls E are arranged oblique or at an inclination to the axle, so as to provide in effect upper and lower bearing-surfaces for the balls, it being seen that while these annular bearing-surfaces are concaved in cross-section they are so relatively arranged that a right line extending from the axle and passing between the two opposing annular bearing-surfaces of either pair will be inclined or oblique with relation to the axis of the axle. The inner ends of the end caps D are adjacent to and opposite the outer flanged ends of the hub-sleeve and can be adjusted toward or away from said flanged ends of the hub-sleeve by adjusting them upon the axle. To such end the outer end portions 7 of the axle which projects beyond the flanged ends of the hub-sleeve or tubular hub 1 are threaded, and the end caps D are adapted to fit and screw upon said threaded portions of the axle, in which way an exceedingly simple mode of adjusting the two-part bearings is provided, and such adjustment can be made with great nicety. The tubular hub and its end flanges can be economically and desirably made of bell metal, while, on the other hand, the cup-ring bearings can be, and in practice are, made of pressed sheet-steel and then hardened.

In machines where the material of the hub provides bearing or bearings for the balls and is for such purpose made of hardened steel a defect in the hub by fire-cracks, apparent either before or after its application to the machine, entails a considerable loss. On the other hand, however, should a flaw be at any time discovered in the cup-ring bearing B another cup-ring bearing can be supplied at a trifling cost. Moreover, these cup-ring bearings B can be readily and economically supplied to users, and can, for example, be sent by mail; also, the user will experience no difficulty in applying a new cup-ring bearing, since the end cap D can be readily unscrewed, and the annular seat 3, having an annular shoulder 4, will enable the user to know just where and how to apply the new cup-ring bearing and, in fact, will not permit its application otherwise than in a proper and accurate way. The adjustable end caps D can also be readily removed when it becomes necessary to clean the bearings, and this can be done by the user and without necessitating the sending of the machine to a factory or repair-shop. The threaded bore of each end cap D is of sufficient length to give the end cap a firm bearing upon the axle, it being observed that the end cap may be said to be comparatively long through its middle and that it thereby affords a suitable body for its bearing-surfaces 6, which, while concaved in cross-section, incline upwardly and outwardly from the axle without weakening the end cap and without cutting off any of the desired length of its threaded bore. In this way, therefore, there is a practical relation between the end cap and inclined bearing, since the inner end or back face of the end cap in effect slopes downwardly toward the longitudinal middle of the axle and thereby permits both an inclined bearing-surface for the balls and a length of threaded bore forming the bearing portion of the end cap upon the axle.

Each end cap D has its back or inner face or end provided with an annular seat 8, in which is fitted a dust-guard F, consisting of a ring of some suitable yielding material, such as felt, sheep-skin with the wool on, paraffine, or the like. The annular groove or seat 8 for the dust-guard is contiguous to the annular margin of the annular concave bearing-surface portion 6 of the end cap, so as to bring its allotted dust-guard opposite the margin of the annular seating-surface 3 of the adjacent hub-flange. The hub-flange has its outer face or end formed so as to recede somewhat from the point where it forms the margin of the annular seating-surface 3, so as to provide the flange in effect with an annular rib or flange 9, which sinks into the yielding dust-guard when the end caps are adjusted along the axle to a proper extent, it being observed that the annular seating-surface 3 for the cup-ring bearing B is made somewhat wider than the cup-ring bearing, so that when the latter is applied with its inner edge against the annular shoulder 5 a portion of the seating-surface 3 next adjacent to its margin will be exposed and thereby permit such marginal portion to sink into the dust-guard, the flange or rib 9 will form an indentation or groove in the dust-guard, and by such arrangement dust and moisture will be excluded from the balls and their allotted bearings.

The end caps D can be made of hardened steel, and, being comparatively small pieces, can be replaced at comparatively small cost should the necessity for such arise.

As arranged in Figs. 1 and 2, the rear end portions 10 of the reach or body-frame are arranged upon the axle and placed against the outer ends of the end caps D, in which position they are held by nuts 11, it being observed that the lower positions 12 of braces for the mud-guard and seat-standard can be arranged between said nuts and portions of the body-frame, and that if desired a step 13 can be arranged between one of the nuts and braces. It is understood, however, that where the axle herein shown is used as the forward axle the parts 10 may represent or illustrate portions of the fork or connections between the fork and axle, and hence that for the general purpose of this application the parts 10 are understood to represent portions of the body-frame of the machine, whether they are parts of the reach or parts of or adjuncts to the spring-fork.

What I claim as my invention is—

1. The combination, in a velocipede, of a hub provided with an annular seat 3, concaved in a cross-section and sunk into the end of the hub, so as to form an annular shoulder 4, arranged to extend back from the end of the hub, a hardened cup-ring bearing B, fitted to said seat, an end cap D, adjustably held upon the axle which extends through the hub and provided with an annular bearing-surface 6, concaved in cross-section, and a set of anti-friction balls arranged between the said bearing-surface 6 and the cup-ring bearing, substantially as described.

2. The combination, in a velocipede, of a hub provided at the end with an annular concaved seat 3, inclined relatively to the axle which extends through the hub and sunk into the end of the hub, so as to form an annular shoulder 4, arranged to extend back from the end of the hub, a hardened cup-ring bearing B, fitted to said seat with its inner edge against the shoulder 4, an end cap D, adjustably held upon the axle and provided with an annular concaved bearing-surface 6, inclined relatively to the axle, and a set of anti-friction balls arranged between the bearing-surface 6 of the end cap and the cup-ring bearing, substantially as described.

3. The combination of the hub provided with an end flange 2, to which the wheel-spokes are secured and having its said flanges provided with annular concaved seats 3, cup-ring bearings B, fitted to said seats, the axle extending through the hub and provided with threaded end portions, end caps D, arranged to screw upon the threaded ends of the axle and provided with annular concaved bearing-surfaces 6, which, in conjunction with the cup-ring bearings, provide opposing correspondingly-arranged bearing-faces for the anti-friction balls which are confined between said bearing-faces, and supporting parts 10 for the body-frame, arranged between nuts 11 and the end caps D, which latter are adapted in size to cover and conceal the lines of separation between the outer annular margin of the annular concaved bearing-surfaces, substantially as described.

4. The combination, in a velocipede, of the hub A, provided with end flanges 2 for the spokes, the axle extending through the hub and provided with threaded end portions, and the end caps D, adapted and applied to screw upon the threaded end portions of the axle and each provided with an annular bearing 6, surrounded by an annular groove which forms a seat 8 for a dust-guard, each said end flange being provided with an annular concave depression forming a seat 3 for a cup-ring bearing and having an outer marginal portion extending beyond the cup-ring bearing and forming the inner side of an annular rib 9 and each end cap D being provided with an annular dust-guard F of yielding material, which is fitted in its annular seat 8 and held against the annular rib 9 of the adjacent end flange of the hub, so as to exclude dust and moisture from a set of balls between the annular bearings 6 and B for the same, substantially as described.

WILLIAM J. EDWARDS.

Witnesses:
CHAS. G. PAGE,
W. MIDDLETON.